US012163616B2

(12) United States Patent
Duncan et al.

(10) Patent No.: US 12,163,616 B2
(45) Date of Patent: Dec. 10, 2024

(54) MAINTENANCE SYSTEMS AND METHODS INCLUDING TETHER AND SUPPORT APPARATUS

(71) Applicant: General Electric Company, Schenectady, NY (US)

(72) Inventors: Alexander Kyle Duncan, Niskayuna, NY (US); Todd William Danko, Niskayuna, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 368 days.

(21) Appl. No.: 17/572,312

(22) Filed: Jan. 10, 2022

(65) Prior Publication Data
US 2023/0220943 A1    Jul. 13, 2023

(51) Int. Cl.
*F16L 55/30*    (2006.01)
*F16L 55/48*    (2006.01)

(52) U.S. Cl.
CPC .............. *F16L 55/30* (2013.01); *F16L 55/48* (2013.01)

(58) Field of Classification Search
CPC ....... F16L 2101/30; F16L 55/30; F16L 55/32; F16L 55/18; F16L 55/48; F16L 55/28;
(Continued)

(56) References Cited

U.S. PATENT DOCUMENTS 5,857,534 A   1/1999 Devault et al.
8,234,010 B2  7/2012 Thompson et al.
(Continued)

FOREIGN PATENT DOCUMENTS

CN   101554892 B   4/2012
EP     2578367 B1   4/2014
(Continued)

OTHER PUBLICATIONS

"Pirjanian" et al., Distributed Control for a Modular, Reconfigurable Cliff Robot, Proceedings of the 2002 IEEE International Conference on Robotics 8 Automation, pp. 4083-4088, May 2002.
(Continued)

*Primary Examiner* — Eric S. McCall
*Assistant Examiner* — Timothy P Graves
(74) *Attorney, Agent, or Firm* — Armstrong Teasdale LLP

(57) ABSTRACT

A system for use in maintaining a structure includes a maintenance apparatus including a maintenance drive system and a maintenance device. The system includes a support apparatus configured to travel in proximity to the structure. The support apparatus includes a body including a first end and a second end and a tether support device coupled to the body. The tether support device includes a housing. The support apparatus also includes a support drive system coupled to the body. The support drive system is configured to propel the support apparatus. The system also includes a tether including a first tether end, a second tether end, and a tether body extending between the first tether end and the second tether end. The maintenance apparatus is operably coupled to the first tether end. The tether support device is coupled to the tether between the first tether end and the second tether end.

19 Claims, 8 Drawing Sheets

(58) Field of Classification Search
CPC ......... F03D 17/00; F03D 80/55; B08B 9/043; B08B 9/0436; B65H 51/18
See application file for complete search history.

(56) References Cited

U.S. PATENT DOCUMENTS

| | | |
|---|---|---|
| 10,953,938 B2 | 3/2021 | Georgeson et al. |
| 2019/0283821 A1* | 9/2019 | Georgeson .............. F03D 80/55 |
| 2020/0063717 A1* | 2/2020 | Georgeson ........... G01N 29/225 |
| 2020/0325878 A1 | 10/2020 | Danko et al. |
| 2021/0025533 A1 | 1/2021 | Duncan et al. |
| 2021/0025534 A1 | 1/2021 | Duncan et al. |
| 2021/0025535 A1 | 1/2021 | Duncan et al. |
| 2021/0025536 A1 | 1/2021 | Duncan et al. |

FOREIGN PATENT DOCUMENTS

| | | | | |
|---|---|---|---|---|
| EP | 2651754 B1 * | 3/2016 | ............. | B63B 59/06 |
| KR | 101381105 B1 | 4/2014 | | |
| KR | 102032822 B1 | 10/2019 | | |

OTHER PUBLICATIONS

"Laranjeira" et al.,Underwater umbilical management between two robots, Laboratoire Cosmer EA 7398—since 2015 Universite de Toulon, pp. 18, Jun. 14, 2019.

* cited by examiner

MAINTENANCE SYSTEMS AND METHODS INCLUDING TETHER AND SUPPORT APPARATUS

STATEMENT REGARDING FEDERALLY SPONSORED RESEARCH AND DEVELOPMENT

This invention was made with Government support under contract number DE-AR0001328 awarded by the Advanced Research Projects Agency-Energy (ARPA-E). The Government has certain rights in this invention.

BACKGROUND

The field of the disclosure relates to maintenance of a structure, and more particularly to systems and methods for maintaining a structure including a maintenance apparatus, a tether operably coupled to the maintenance apparatus, and a tether support apparatus.

Robotic maintenance apparatus may be used to access difficult to reach locations to perform inspection and/or a repair operation on the structure. In some cases, the maintenance apparatus may travel a relatively large distance from a base station to a repair site, while navigating through complex layouts. For example, a maintenance apparatus may drive around obstacles on a factory floor to reach one or more repair sites on a structure. Additionally, a maintenance apparatus may travel within a pipe to an inspection or repair site within the pipe. Pipes may extend over relatively large distances and have various obstacles, including bends, branches, corners, etc. The base station, located remotely from the repair or inspection site, typically includes a controller, a power source, and a reservoir of material for the maintenance apparatus.

In at least some known systems, the maintenance apparatus is operably connected to a supply tether extending from the base station along the route to the maintenance apparatus. The supply tether delivers power, communication, and/or material from the base station to the maintenance apparatus as the maintenance apparatus travels along the route. The maintenance apparatus tows the supply tether as the maintenance apparatus traverses along a route to a repair site. Long supply tethers, used for longer route distances, may significantly increase the weight of the tether towed by the maintenance apparatus. In some cases, the weight of the tether may slow or restrict movement of the maintenance apparatus. Moreover, the supply tether may become caught or impinged on obstacles along the route, arresting the movement of the maintenance apparatus. In addition, the tether may become twisted or kinked, impeding the flow of material through the supply tether and in some cases, causing leaks or cracks in the tether.

At least some known supply tethers are manufactured to a specific length and housed on a spool for transportation. The length of a single tether may be selected due to manufacturing limitations and/or transportation restrictions. In some cases, a single tether may not be long enough to extend from the base station, along the route, to the site of inspection or repair.

Accordingly, it is desirable to provide a system for maintaining a structure including a maintenance apparatus configured to travel to a repair site to perform a maintenance operation and a tether support apparatus supporting a length of a supply tether between the base station and the maintenance apparatus.

BRIEF DESCRIPTION

In one aspect, system for use in maintaining a structure is provided. The system includes a maintenance apparatus and a support apparatus configured to travel in proximity to the structure. The maintenance apparatus includes a maintenance drive system and a maintenance device. The support apparatus includes a body including a first end and a second end, a tether support device coupled to the body, and a support drive system coupled to the body. The tether support device includes a housing. The support drive system is configured to propel the support apparatus. The system further includes a tether and a controller. The tether includes a first tether end, a second tether end, and a tether body extending between the first tether end and the second tether end. The maintenance apparatus is operably coupled to said first tether end and the tether support device is coupled to the tether between said first tether end and said second tether end. The controller is configured to send instructions to at least one of said maintenance drive system and said support drive system.

In another aspect, a method for maintaining a structure is provided. The method includes coupling a tether to a maintenance apparatus. The maintenance apparatus including a maintenance drive system and a maintenance device. The tether including a first tether end, a second tether end, and a tether body extending between the first tether end and the second tether end. The method further includes positioning the maintenance apparatus in proximity to the structure and coupling a tether support device to the tether. The tether support device is coupled to a support apparatus. The method further includes propelling the maintenance apparatus along a first route using the maintenance drive system, positioning the support apparatus in proximity to the structure, and propelling the support apparatus along a second route using a support drive system.

In yet another aspect, a support apparatus for interacting with a tether is provided. The apparatus includes a body, a tether support device, and a support drive. The body includes a housing having a first end and a second end. The tether support device coupled to the body. The tether includes a first tether end, a second tether end, and a tether body extending between the first tether end and the second tether end. The tether support device comprising a housing defining a cavity sized and shaped to receive the tether body for said support apparatus to interact with said tether. The support drive system coupled to said body and communicatively coupled to a controller, wherein a maintenance apparatus is operably coupled to said tether, and wherein said support drive system is configured to move said body and said tether support device when said maintenance apparatus is in motion.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
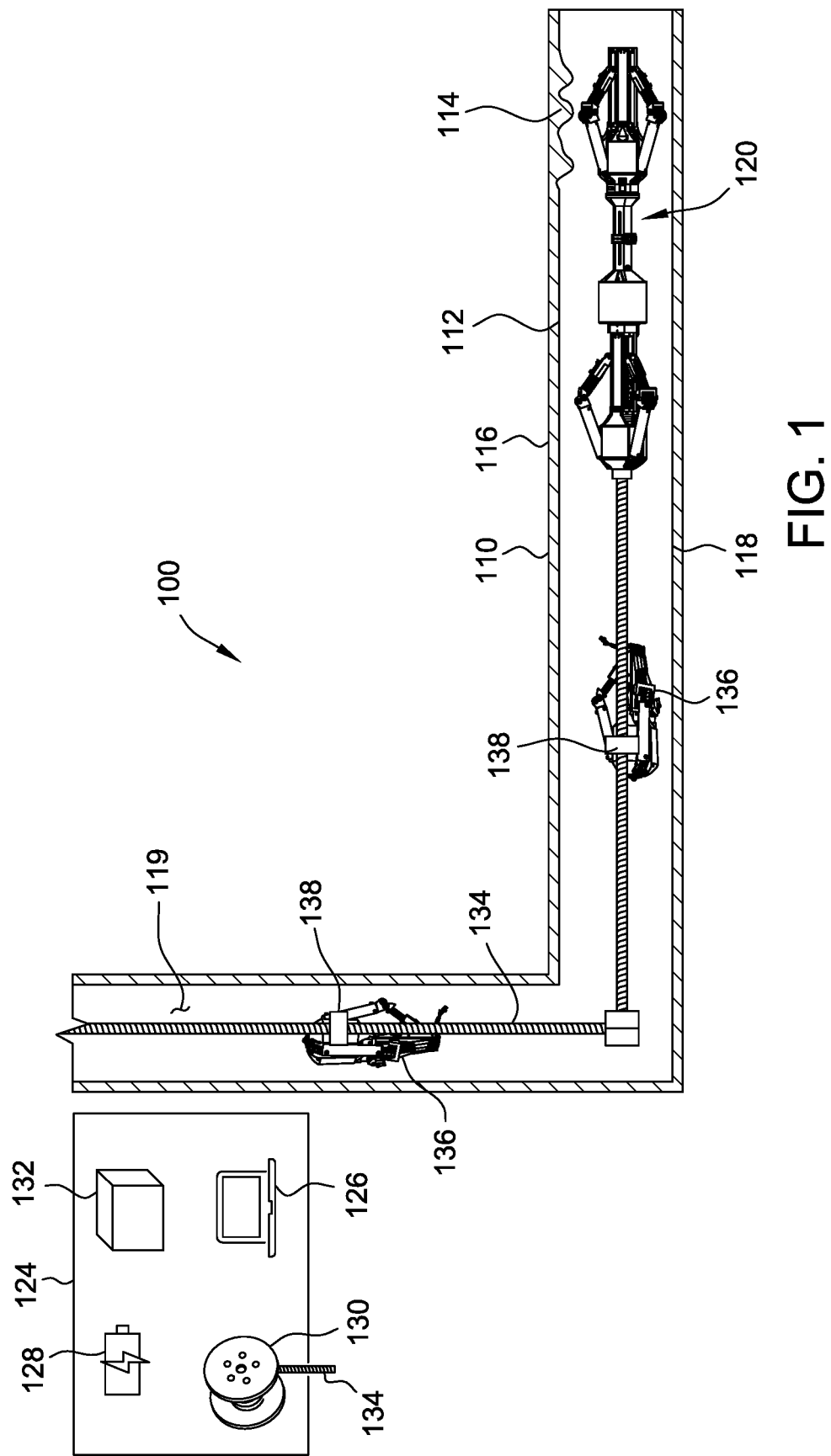
FIG. 1 is a schematic view of a system for maintaining a structure, the system including a maintenance apparatus, a support apparatus, and a tether extending between a base station and the maintenance apparatus.
Figure 3:
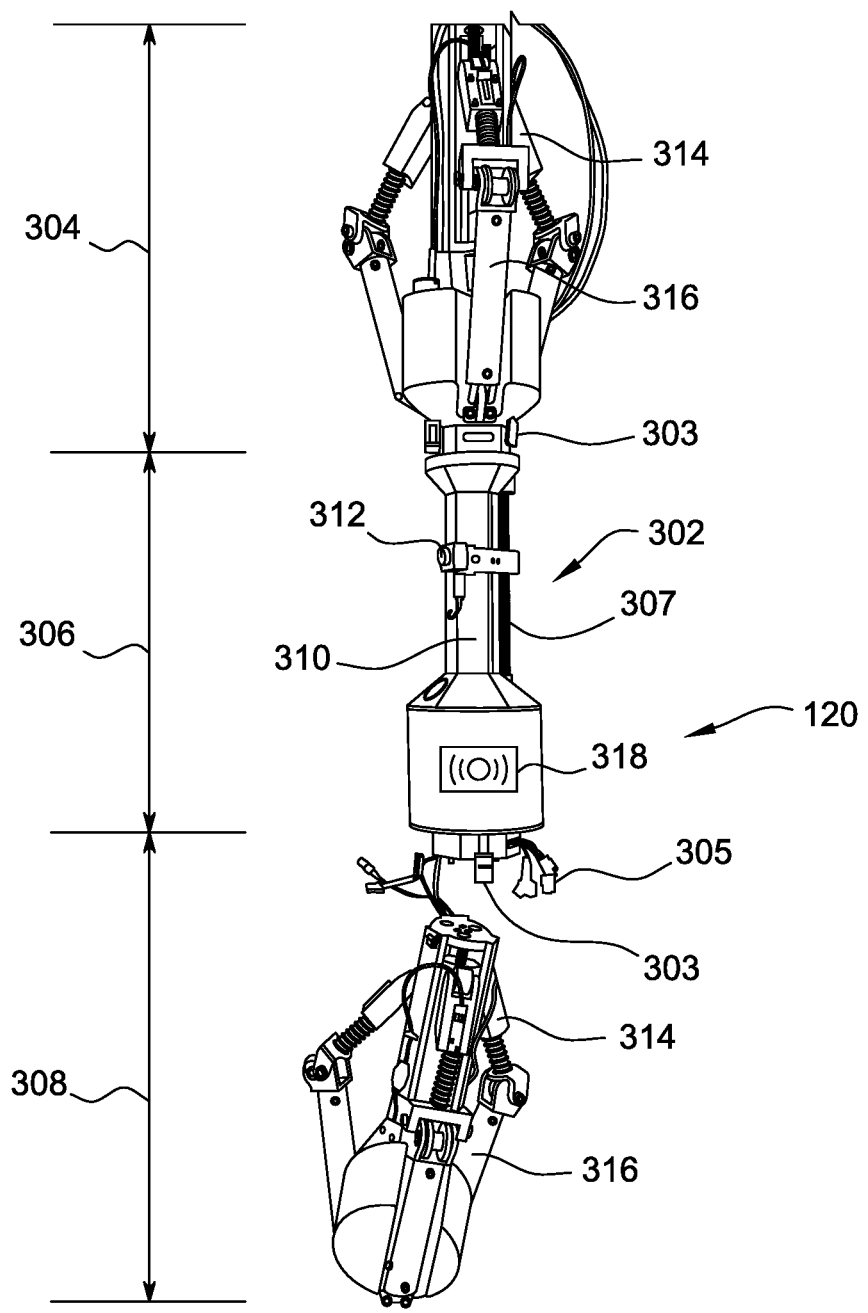
Figure 4:
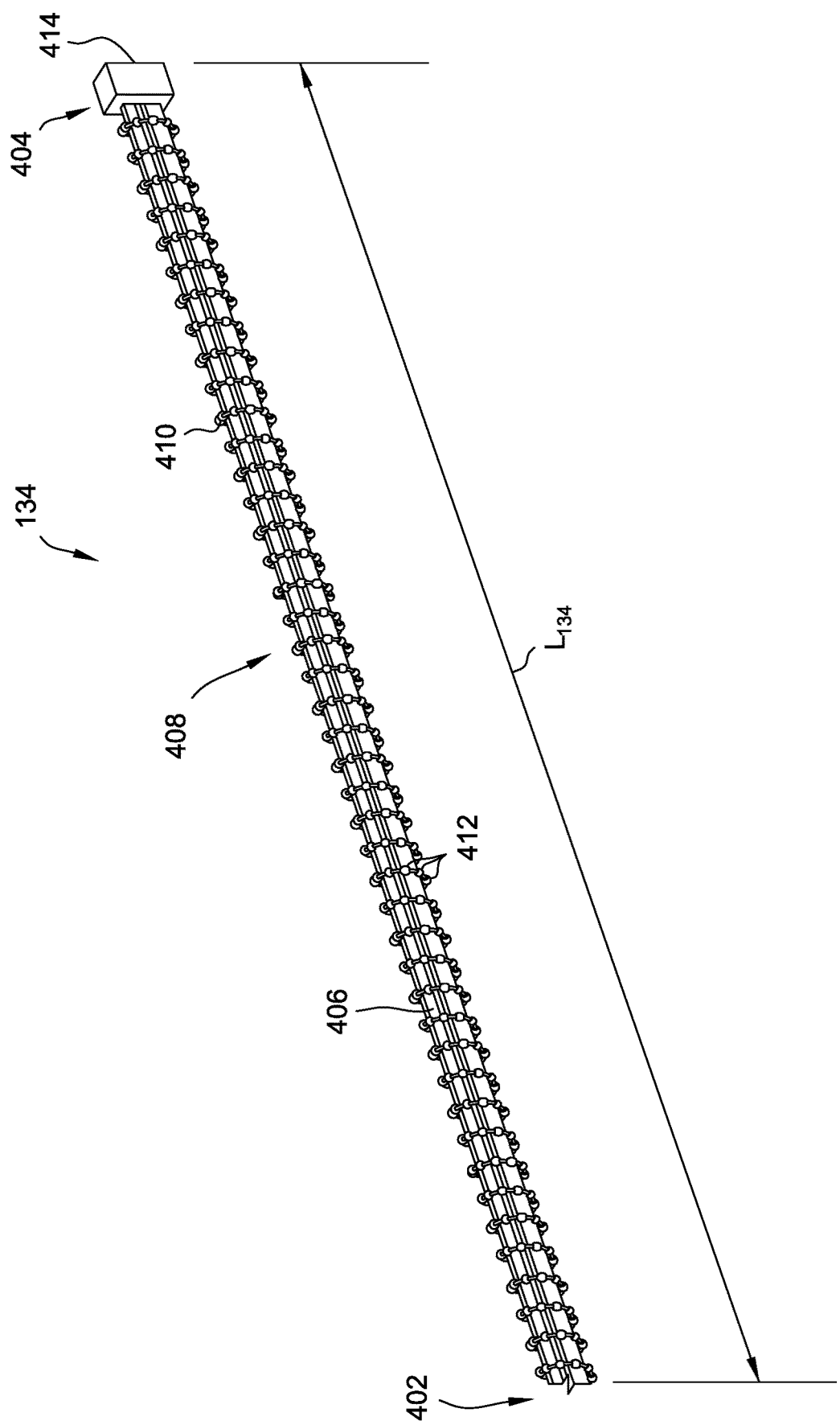
Figure 5:
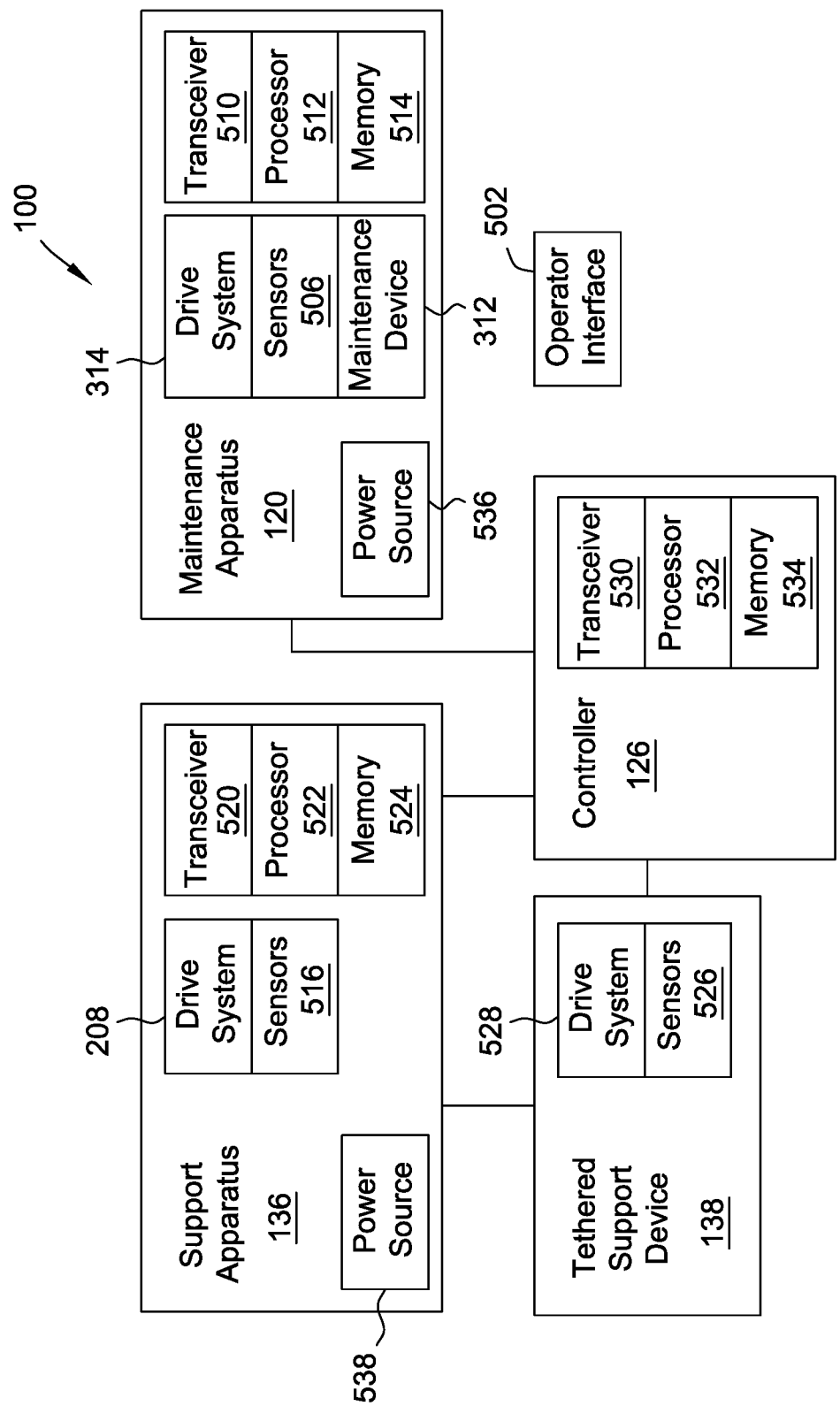
Figure 6:
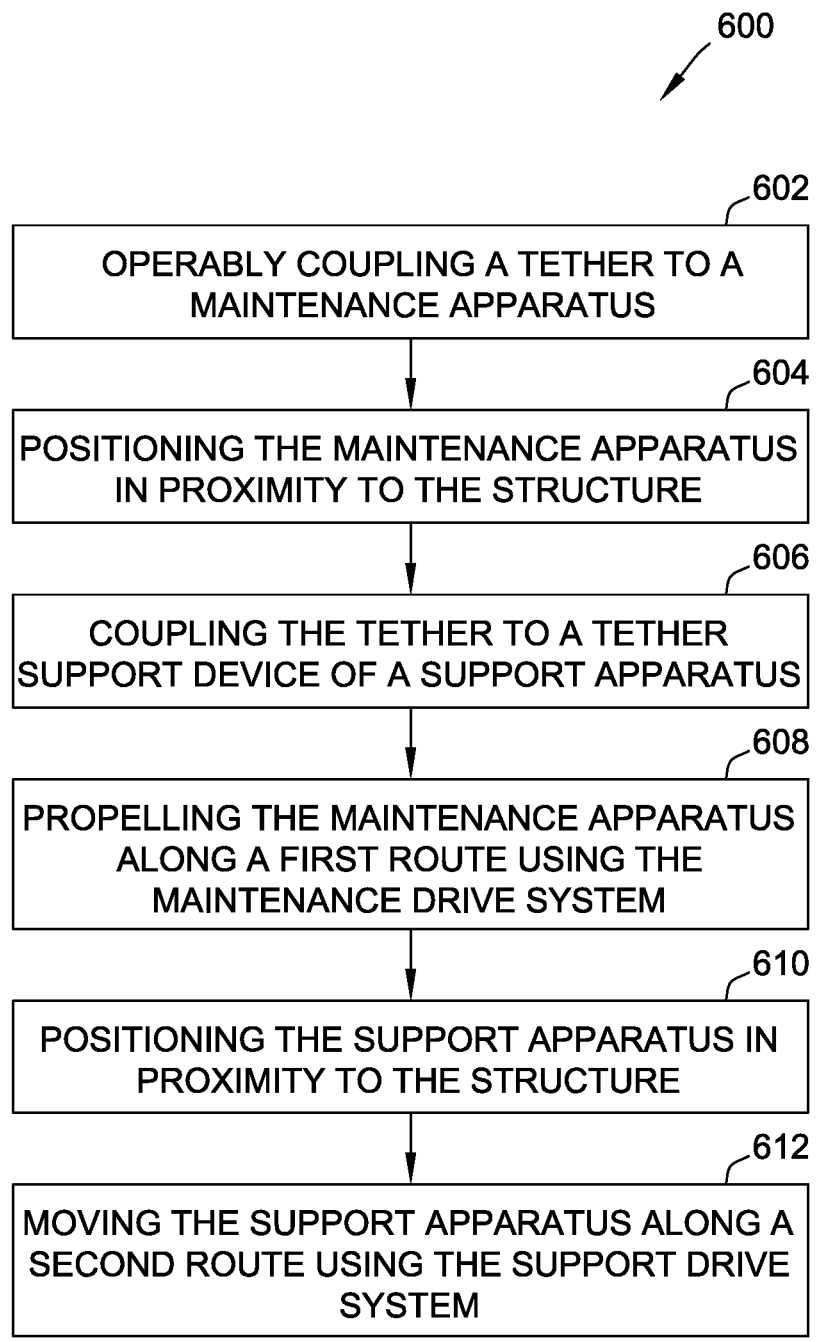
Figure 7:
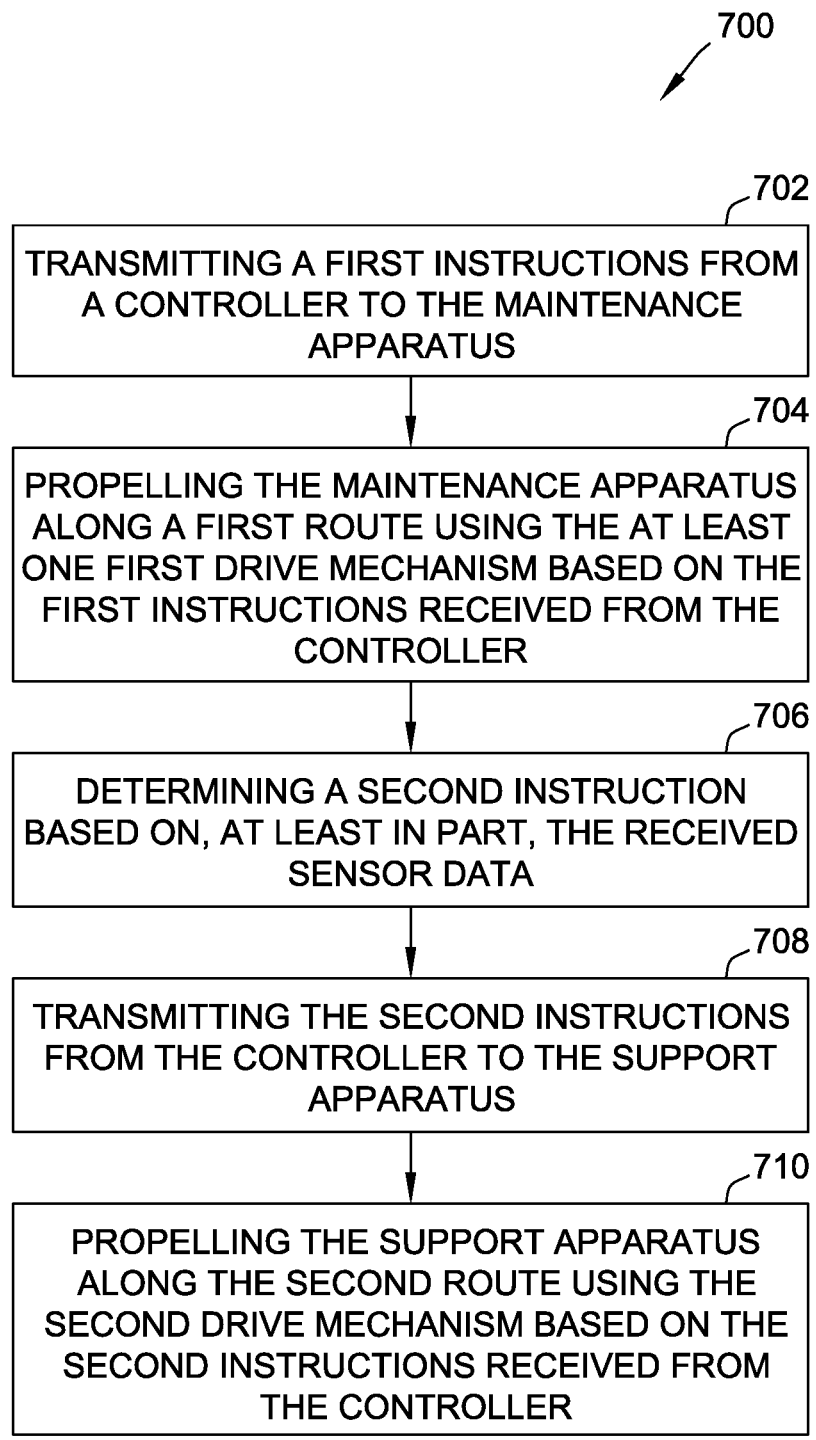
Figure 8:
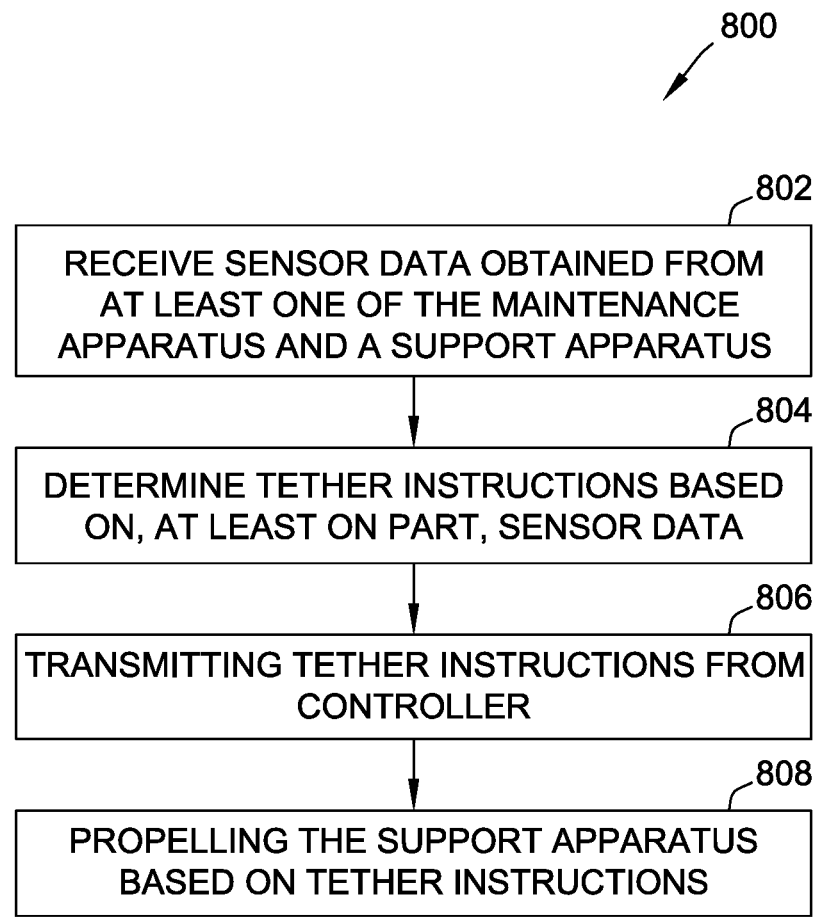

1, illustrating the support apparatus of the system including a tether support device for interacting with the tether;

FIG. 3 is a perspective view of an example embodiment of a maintenance apparatus for use with the system shown in FIG. 1, the maintenance apparatus partially disassembled;

FIG. 4 is a perspective view of a portion of an example embodiment of a tether for use with the system shown in FIG. 1;

FIG. 5 is a block diagram of system for use in maintaining the structure shown in FIG. 1;

FIG. 6 is a flow chart of an example method of moving the maintenance apparatus and the support apparatus shown in FIGS. 1-5 along a route to a target site;

FIG. 7 is a flow chart of an example method of controlling the maintenance, support apparatus, and tether support device shown in FIGS. 1-5; and FIG. 8 is a flow chart of an example method of supporting the tether by controlling the support apparatus, the tether support device, and the maintenance apparatus shown in FIGS. 1-5.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the example embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Embodiments described herein relate to systems, methods, and apparatuses for maintaining a structure including a maintenance apparatus and a support apparatus. The support apparatus is configured to support a supply tether that delivers power, communication, and/or material to the maintenance apparatus for performing an inspection and/or a repair operation. The maintenance apparatus and/or the support apparatus is capable of moving (e.g., the maintenance apparatus is self-propelled) along a route from a base station to a target site in need of repair, maintenance, and/or inspection. In some embodiments, the maintenance apparatus and/or the support apparatus is a multi-legged independently actuated apparatus for performing inspection and repair operations at one or more difficult to access locations. The base station is positioned remotely from the target site, enabling an operator located a distance away from the target site to interact with the maintenance apparatus via a controller. A tether is operably connected to the maintenance apparatus enabling the tether to supply power, communication (e.g., signals and/or instructions from the controller), and materials from the base station to the maintenance apparatus as the maintenance apparatus travels to the target site. Embodiments of systems and methods described herein may be used for any type of structure. For example, and without limitation, the structure may include a turbine, an engine, and/or a compressor or any other structure that includes at least one difficult to access site that is in need of repair and/or inspection.

A controller, typically located at the base station, transmits navigational instructions to the maintenance apparatus and the support apparatus. In some embodiments, the controller transmits similar navigational instructions to both the maintenance apparatus and the support apparatus. In some embodiments, the controller transmits navigational instructions to the support apparatus based on a detected movement of the maintenance apparatus. Accordingly, the controller facilitates coordinated movement of the maintenance apparatus, the support apparatus, and the tether.

The system includes a support apparatus for interacting with the tether. The support apparatus may be coupled to the tether at any selected position between the base station and the maintenance apparatus. For example, the support apparatus performs at least one of supporting the weight of the tether, towing the tether along the route, and/or repositioning or redirecting the tether. The support apparatus controls the movement of the tether to prevent the tether from catching, tangling, or hindering movement of the maintenance apparatus as the maintenance apparatus travels to the target site. For example, the support apparatus facilitates the maintenance apparatus traveling long and/or complicated routes because the support apparatus is capable of directing and repositioning the tether to prevent the tether from being caught or impinged on various obstacles along the route. In some embodiments, the system includes a plurality of support apparatus spaced apart along the tether. In some embodiments, the support apparatus relays signals from the controller to the tether and/or to the maintenance apparatus. The support apparatus may include a pump, such that the support apparatus assists in pumping material through the tether. In some embodiments, the support apparatus includes a heating element and/or a cooling element and the support apparatus regulates the temperature of the tether.

FIG. 1 is a schematic view of a system 100 for maintaining a structure 110. System 100 includes a maintenance apparatus 120, a support apparatus 136, and a tether 134 extending between a base station 124 and maintenance apparatus 120. Structure 110 has a surface 112 that includes a target site 114. Target site 114 includes one or more locations on structure 110 in need of repair, maintenance, and/or inspection. In the illustrated embodiment, structure 110 includes a pipe having a sidewall 116 having an interior surface 118 defining an interior cavity 119. In the example embodiment, target site 114 is a portion of surface 112 including an anomaly and/or requiring a repair operation.

The maintenance apparatus 120 performs a repair, a maintenance, or an inspection operation at target site 114. Base station 124 is located remotely from target site 114 and includes a controller 126, a power source 128, one or more spools 130, and/or one or more material reservoirs 132. In some embodiments, base station 124 includes any suitable components enabling system 100 to function as described herein. Tether 134 is operably connected between base station 124 and maintenance apparatus 120. Tether 134 supplies power, signals (e.g., control instructions), and materials from base station 124 to maintenance apparatus 120. Additional tethers 134 may be stored on spool 130 located at base station 124. For distances between base station 124 and target site 114, one or more tethers 134 may be operably coupled together increasing the overall length of tether 134.

Support apparatus 136 engages with tether 134, enabling support apparatus 136 to perform at least one of towing tether 134, supporting the weight of tether 134 and/or directing tether 134. Support apparatus 136 includes at least one tether support device 138 for interacting with tether 134. For example, tether support device 138 is coupled to tether 134, and support apparatus 136 moves to tow and/or position tether 134. Tether support device 138 may be rotationally coupled to support apparatus 136 such that tether support device 138 may be rotated relative to support apparatus 136. In some embodiments, support apparatus 136 performs at least one of controlling the temperature of tether 134 and/or pumping materials through tether 134.

Controller 126, located at base station 124, is in communication with at least one of maintenance apparatus 120, support apparatus 136, and/or tether support device 138. For example, controller 126 transmits one or more navigational instructions to at least one of maintenance apparatus 120 and support apparatus 136 to move maintenance apparatus 120 and support apparatus 136 along one or more routes from base station 124 to target site 114. In some embodiments, controller 126 transmits navigational instructions to both support apparatus 136 and maintenance apparatus 120 such that support apparatus 136 generally follows the same route taken by maintenance apparatus 120. In some embodiments, controller 126 transmits unique navigational instructions to each of maintenance apparatus 120 and support apparatus 136.

In the example embodiment, maintenance apparatus 120 and support apparatus 136 are configured to travel relative to structure 110 based on instructions received from controller 126. For example, support apparatus 136 and maintenance apparatus 120 may travel in proximity to, about, around, and/or through structures 110. In some embodiments, maintenance apparatus 120 and support apparatus 136 may travel through cavity 119 and along interior surface 118. As maintenance apparatus 120 travels relative to structure 110, maintenance apparatus 120 is used to inspect and/or repair any components of structure 110. In some embodiments, maintenance apparatus 120 generates an image of surface 112 and the image is examined to determine whether repairs are necessary. If repairs are necessary, maintenance apparatus 120 may be used to repair surface 112. For example, maintenance apparatus 120 may patch a portion of surface 112. In some embodiments, support apparatus 136 and maintenance apparatus 120 may be self-propelled, meaning that support apparatus 136 and maintenance apparatus 120 may move without external forces. In some embodiments, during a maintenance or inspection operation, maintenance apparatus 120 and support apparatus 136 may travel a distance of 500 meters or more along a route from base station 124 to target site 114.

In the illustrated embodiment, system 100 includes two support apparatus 136 spaced apart along tether 134. For longer routes, the number of support apparatus 136 may be increased to accommodate increases in the length and weight of tether 134. In some embodiments, system 100 includes a plurality of support apparatus 136, each of support apparatus 136 spaced apart by 1 meter to 500 meters along the length of tether 134. Each of support apparatus 136 may be spaced apart by a distance that is selected based on the weight of tether 134. For example, each of support apparatus 136 may be enabled to support and/or tow a weight of 680 kg (~1500 lbs), for example. In other example embodiments, each of support apparatus 136 may be enabled to support or tow any weight necessary to support the weight of tether 134, including the weight of the tether 134 that is filled with material. In further embodiments, support apparatus 136 are spaced apart by the length of a single tether 134. The number of support apparatus 136 may be selected based on the complexity of the route and/or the requirements of maintenance apparatus 120. For example, for longer routes, increases in the length of tether 134 increases the weight of tether 134. Accordingly, additional support apparatus 136 may be used to support the additional weight of tether 134. For some routes it may be challenging to supply material from base station 124 to the remote target site 114, for example, when base station 124 is located in at a lower elevation relative to target site 114 and gravitational effects slow the movement of material through tether 134. In another example, support apparatus 136 may include a pump to facilitate movement of material transported through the tether 134. System 100 includes any number of support apparatus 136 enabling system 100 to function as described herein. In some embodiments, each of the plurality of support apparatus 136 may be different and interact with tether 134 in different ways. For example, a first support apparatus may be used to support the weight of tether 134 and/or tow and position tether 134, while a second support apparatus may be used to pump material through tether 134.

Figure 2:
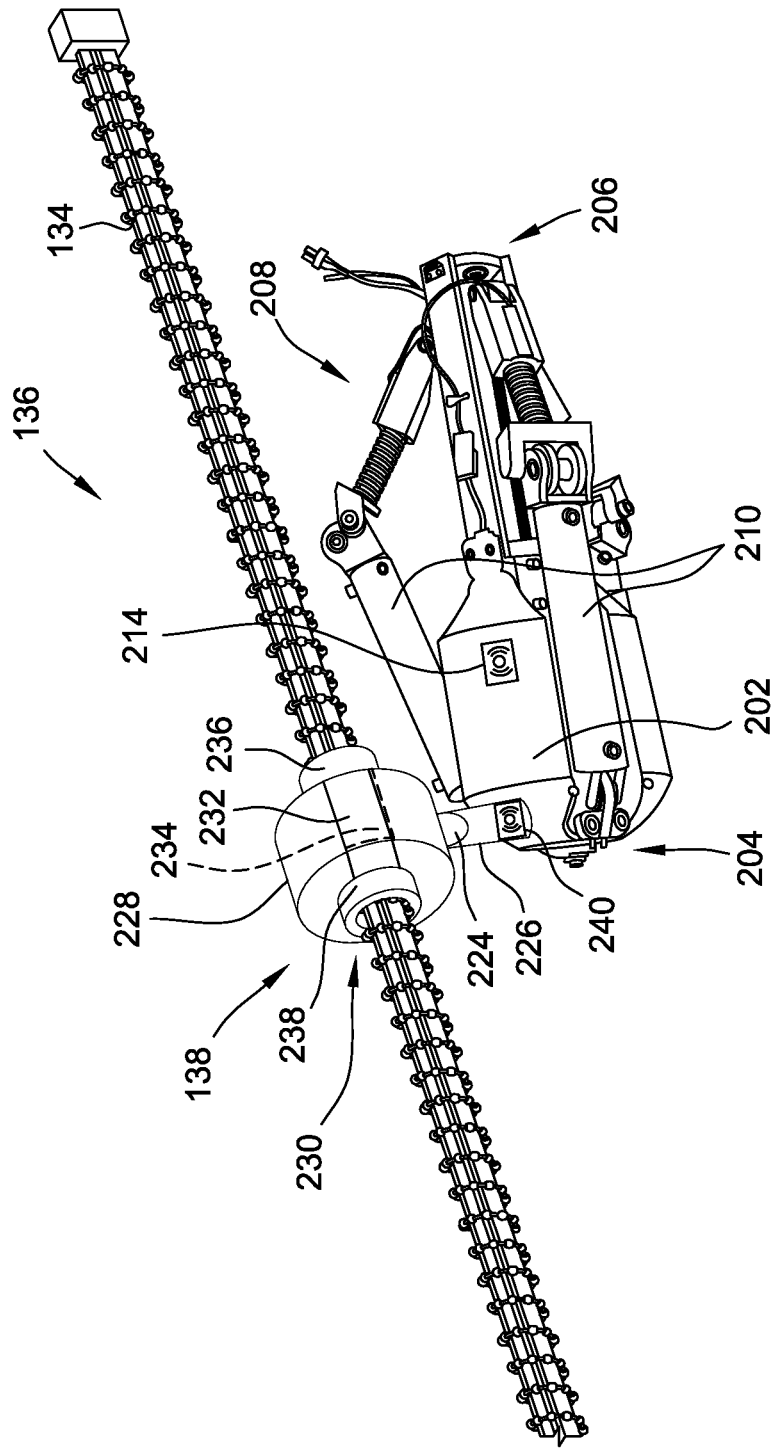
FIG. 2 is a perspective view of an example embodiment of a support apparatus for use with the system shown in FIG.

FIG. 2 is a perspective view of an example embodiment of support apparatus 136 for use with system 100 shown in FIG. 1, illustrating support apparatus 136 of system 100 including tether support device 138 for interacting with the tether 134. In the example embodiment, support apparatus 136 includes a support body 202 having a first end 204 and a second end 206, and at least one support drive system 208 operably connected to a plurality of actuated legs 210. Additionally, and/or alternatively, in some embodiments, support body 202 may include one or more components capable of moving support apparatus 136 (e.g., wheels, tracks, and the like).

Support apparatus 136 includes any drive system that enables support apparatus 136 to function as described herein. Alternatively, support apparatus 136 does not include support drive system 208. For example, in some embodiments, support apparatus 136 is connected by a linkage to a separate apparatus which includes support drive system 208. In some embodiments, one or more support apparatus 136 may be linked together. For example, in some embodiments, at least one of support apparatus 136 is a first support apparatus including support drive system 208 and a secondary support apparatus, that does not include support drive system 208, is linked to first support apparatus 136. Accordingly, support apparatus 136 may push or pull one or more of a secondary support apparatus.

Support apparatus 136 includes at least one support sensor 214 that is communicatively coupled to controller 126. Support sensor 214 is capable of detecting a parameter associated with the surroundings of support apparatus 136. In some embodiments, support sensor 214 is capable of detecting movement of maintenance apparatus 120. For example, in some embodiments, support sensor 214 includes a motion sensor or a camera for visualizing maintenance apparatus 120, structure 110, and/or surroundings of support apparatus 136. Support sensor 214 may also detect motion of maintenance apparatus 120 and/or a secondary and/or an adjacent support apparatus 136.

In the example embodiment, tether support device 138 is mounted and/or coupled to support body 202. In alternative embodiments, tether support device 138 is formed integrally with support body 202 of support apparatus 136. In some embodiments, tether support device 138 is selectively positionable relative to support body 202. For example, tether support device 138 may be attached, detached, repositioned, and reattached to support body 202 in a plurality of locations on support body 202. The selectively positionable arrangement of tether support device 138 enables an operator to customize the position and orientation of tether support device 138 relative to support apparatus 136 based on the route. For example, tether support device 138 may be selectively positioned on support apparatus 136 based on the clearance between support apparatus 136 and various obstacles along the route, a type of tether 134, and/or the weight and length of tether 134.

In some embodiments, tether support device 138 may be rotationally and/or translatably coupled to support body 202 via a joint 224 enabling tether support device 138 to be rotated and/or translated relative to support body 202. Joint 224 may include a translational joint and/or a rotational joint. Translations of joint 224 may be used to position tether support device 138, and tether 134, away from or towards support body 202. Rotations of joint 224 orientates tether support device 138, and tether 134, relative to support body 202. For example, joint 224 may be rotated such that tether 134 extends outwards from first end 204 and second ends 206 of support apparatus 136. Joint 224 may be rotated such that tether 134 extends generally perpendicular to support body 202. In some embodiments, joint 224 may be manually manipulated by an operator, i.e., tether support device 138 may be rotated and/or translated by hand to adjust the orientation and position of tether support device 138, and tether 134, relative to support body 202. Additionally, and/or alternatively, tether support device 138 includes a joint actuator 226 to rotate and/or translate joint 224 to orientate and position tether support device 138. Joint actuator 226 is in communication with controller 126 allowing an operator to adjust the orientation and position of tether support device 138 remotely.

In the illustrated embodiment, tether support device 138 includes a housing 228 defining a cavity 230 extending through housing 228. Cavity 230 is sized and shaped to receive at least a portion of tether 134. Tether 134 may be passed through cavity 230, such that tether 134 extends through cavity 230 and outward from cavity 230 on first end 204 and second end 206 of support body 202. Tether 134 may be passed into cavity 230 and support apparatus 136 may travel along tether 134 to position support apparatus 136 at a desired location on tether 134. In some embodiments, tether support device 138 includes a gate 232 and a passageway 234 leading to cavity 230. Gate 232 may be positioned relative to housing 228 in either an opened position or a closed position. When gate 232 is in the opened position, tether 134 may be passed through passageway 234, to be received within cavity 230. In the closed position, gate 232 at least partially retains tether 134 within cavity 230. In some embodiments, gate 232 may be rotationally coupled to housing 228 such that gate 232 may be rotated relative to the housing 228 to arrange gate 232 in either an opened or a closed position.

Cavity 230 is sized and shaped to accommodate tether 134. The shape of cavity 230 may be customizable to tether 134 (e.g., to the shape, size, and/or type of tether 134). For example, cavity 230 may be generally cylindrical in shape to accommodate a cylindrically shaped tether 134. In other embodiments, cavity 230 is sized and shaped to accommodate other shapes and sizes of various types of tethers 134. Tether support device 138 performs one or more interactions with tether 134, including supporting the weight of tether 134, repositioning and/or directing tether 134, and/or towing (pulling or pushing) tether 134. In some embodiments, tether support device 138 is translatably coupled to tether 134 such that support apparatus 136 may move relative to tether 134, i.e., support apparatus 136 may move generally parallel along a length of tether 134. While tether support device 138 is translatably coupled to tether 134, support apparatus 136 may move relative to tether 134 and support the weight of tether 134. In some embodiments, tether support device 138 may be fixedly coupled to tether 134 and movement of support apparatus 136 is transmitted to tether 134 enabling support apparatus 136 to tow tether 134.

In some embodiments, tether support device 138 includes an adjustable coupling 236 that at least partially surrounds tether 134 when tether 134 is supported by tether support device 138. Adjustable coupling 236 may be arranged in at least one of a first position or a second position. In the first position, adjustable coupling 236 is in a fixedly coupled arrangement and adjustable coupling 236 fixedly couples tether 134 to tether support device 138. In the fixedly coupled arrangement, adjustable coupling 236 constricts around tether 134 such that adjustable coupling 236 and tether 134 are frictionally engaged and motion of support apparatus 136 is transmitted to tether 134 by adjustable coupling 236. Accordingly, in the fixedly coupled arrangement, movement of support apparatus 136 moves tether 134. In the second position, adjustable coupling 236 is in a translatably coupled arrangement in which tether 134 is disposed within cavity 230 but tether 134 and housing 228 are not frictionally engaged. In other words, there is sufficient clearance between tether 134 and housing 228 such that support apparatus 136 may travel along tether 134 as tether 134 passes through cavity 230.

Tether support device 138 may be selectively arranged in either the translatably coupled arrangement or the fixedly coupled arrangement. For example, adjustable coupling 236 may be positioned in the translatably coupled arrangement, enabling support apparatus 136 to move along of tether 134 to position support apparatus 136 relative to tether 134. Adjustable coupling 236 may be positioned in the fixedly coupled arrangement, enabling support apparatus 136 to move and/or tow tether 134. In some embodiments, tether support device 138 may include an actuated mechanism 238, communicatively coupled to controller 126, enabling an operator to remotely position adjustable coupling 236 in either the first position or the second position relative to tether 134. For example, in some embodiments, adjustable coupling 236 is a pneumatically actuated coupling, which may be selectively inflated to tighten adjustable coupling 236 around tether 134 in order to fixedly coupled tether support device 138 to tether 134. Likewise, the pneumatically actuated coupling may be selectively deflated to loosen adjustable coupling 236 around tether 134 to translatable couple tether support device 138 to tether 134.

In some embodiments, tether support device 138 may be selectively coupled to and/or released from tether 134. For example, in some embodiments, gate 232 may be opened to release tether 134 from tether support device 138. In some embodiments, tether support device 138 includes a device sensor 240 for detecting a parameter associated with tether 134 and/or tether support device 138. For example, in some embodiments, device sensor 240 is a force sensor for detecting forces between tether 134 and tether support device 138. Device sensor 240 may collect data related to the weight of tether 134. Changes in the weight of tether 134 may be an indication that tether 134 is caught or impinged. Device sensor 240 is communicatively connected to controller 126 (shown in FIG. 1). Controller 126 may notify an operator if device sensor 240 detects a change in the weight of tether 134. Controller 126 may analyze data received from device sensor 240 to determine that tether 134 is caught. In response to determining that tether 134 is caught, controller 126 may automatically transmit an instruction signal to at least one of tether joint actuator 226, actuated mechanism 238, support apparatus 136, and/or maintenance apparatus 120. For example, if device sensor 240 detects a sudden change in the weight of tether 134, controller 126 may transmit an instruction signal to stop and/or hold the position of support apparatus 136 and/or maintenance apparatus 120. In some embodiments, device sensor 240 may include a situational awareness camera allowing an operator to visualize tether 134 and tether support device 138 while support apparatus 136 and/or maintenance apparatus 120 travels along a route.

FIG. 3 is a perspective view of an example embodiment of maintenance apparatus 120 for use with system 100 shown in FIG. 1, with maintenance apparatus 120 partially disassembled. In the example embodiment, maintenance apparatus 120 includes a body assembly 302 that is modular and includes a plurality of portions that are detachably coupled together. In the illustrated embodiment, body assembly 302 includes a first maintenance drive portion 304, a maintenance portion 306, and a second maintenance drive portion 308. In alternative embodiments, body assembly 302 includes any portions that enable maintenance apparatus 120 to operate as described herein. In the example embodiment, first maintenance drive portion 304 and second maintenance drive portion 308 are coupled to opposite ends of maintenance portion 306. Portions 304, 306, 308 are coupled together in any suitable manner. For example, in some embodiments, portions 304, 306, 308 include clips 303 that are engaged when portions 304, 306, 308 are coupled together. In some embodiments, the connections between portions 304, 306, 308 include draw latches with locating pins. In alternative embodiments, maintenance apparatus 120 includes any coupling device that enables maintenance apparatus 120 to operate as described herein.

In addition, in the example embodiment, each portion 304, 306, 308 of maintenance apparatus 120 includes standardized electrical connection 305 that allow for coupling of electrical components on portions 304, 306, 308 together. In addition, maintenance apparatus 120 fits through a smaller opening, leading to structure 110, because maintenance apparatus 120 includes portions 304, 306, 308. In some embodiments, portions 304, 306, 308 of maintenance apparatus 120 are able to be individually positioned relative to structure 110 and then individually positioned through an opening in structure 110 and then coupled together. Moreover, maintenance apparatus 120 allows for simpler removal and replacement of components of maintenance apparatus 120.

Maintenance portion 306 includes a maintenance body 310 having an axial track 307. In addition, in the example embodiment, at least one maintenance device 312 is coupled to maintenance body 310 and configured to move along maintenance body 310 of maintenance portion 306. Specifically, maintenance device 312 moves along axial track 307 of maintenance body 310. maintenance portion 306 includes a maintenance actuator assembly configured to position maintenance device 312 relative to maintenance body 310. In alternative embodiments, maintenance portion 306 includes any maintenance body 310 that enables maintenance apparatus 120 to operate as described herein. Electrical connections 305 allow maintenance portions 306 with different maintenance devices 312 to be interchanged with each other without requiring swapping or adjusting the electrical connections. As a result, maintenance apparatus 120 is adaptable for different maintenance operations using various devices and/or portions. For example, maintenance device 312 can move translationally in a travel direction along body assembly 302 as well as rotate in rotation direction about body assembly 302, offering maintenance device 312 a field of coverage.

Each of first and second maintenance drive portions 304 and 308 includes one or more of a maintenance drive system 314 configured to move body assembly 302 relative to structure 110. For example, each of first and second maintenance drive portions 304 and 308 includes a plurality of the maintenance drive system 314 such as wheels, and a motor (not shown) drivingly coupled to wheels. In addition, in the example embodiment, drive portions 304 and 308, each include leg assemblies 316 coupled to maintenance drive system 314. A power source, such as a battery, provides power for operation of the motor. In some embodiments, power is provided via tether 134. During operation, the motor induces rotation of wheels relative to body assembly 302. Maintenance apparatus 120 moves along the route as wheels rotate in contact with a surface, such as an interior of pipe. In alternative embodiments, maintenance apparatus 120 includes any maintenance drive system, 314 that enables maintenance apparatus 120 to operate as described. For example, in some embodiments, maintenance drive system 314 includes a drive mechanism other than wheels, such as treads, tracks, worms, legs, and/or electromagnetic or fluidic locomotion mechanisms.

In the example embodiment, maintenance apparatus 120 includes at least one maintenance sensor 318 and at least one repair tool (not shown). For example, maintenance portion 306 includes a laser ablation tool, a plurality of depth sensors, and a laser cladding head. In alternative embodiments, maintenance apparatus 120 includes any devices that enable maintenance apparatus 120 to operate as described herein. For example, in some embodiments, maintenance apparatus 120 includes, without limitation, any of the following: an applicator, a drill, a grinder, a heater, a welding electrode, and/or a sprayer. Maintenance sensor 318 may include an optical sensor (e.g., visible, infrared, and/or multi-spectral sensor), a mechanical sensor (e.g., stylus profilometer, coordinate measurement probe, load transducer, linear variable differential transformer), a thermal sensor (e.g., pyrometer, thermocouple, resistance temperature detector), a magnetic sensor, an acoustic sensor (e.g., piezoelectric, microphone, ultrasound), and an electromagnetic sensor (e.g., eddy current, potential drop, x-ray). In some embodiments, maintenance sensor 318 is used to provide information for steering maintenance apparatus 120 and/or to perform a maintenance operation.

In other example embodiments, maintenance apparatus 120 may include any type of apparatus capable of performing a maintenance, inspection, and/or a repair operation on structure 110.

FIG. 4 is a perspective view of an example embodiment of tether 134 for use with system 100, shown in FIG. 1. Tether 134 includes a first tether end 402, a second tether end 404, and a tether body 406 extending between first tether end 402 and second tether end 404. Tether 134 may be coupled to maintenance apparatus 120 and extend from base station 124 to maintenance apparatus 120, while maintenance apparatus 120 travels along a route to target site 114. In some embodiments, tether 134 provides power, communication, and material to maintenance apparatus 120.

In the illustrated embodiment, tether 134 includes a cable 408. Cable 408 transmits electrical power and/or communication between controller 126 (shown in FIGS. 1 and 5) and maintenance apparatus 120 (shown in FIG. 3). For example, cable 408 may include electrically conductive material such as copper wiring. In some example embodiments, controller 126 may communicate wirelessly with maintenance apparatus 120. Cable 408 may also enable channeling of a material between maintenance apparatus 120 (shown in FIG. 1) and an external material reservoir 132 (shown in FIG. 1). For example, the material may include a fluid such as a cooling liquid or refrigerant. In some embodiments, the material may include welding material for performing a welding operation.

The tether body 406 may include a tether casing configured to reduce contact between surface 112 (shown in FIG. 1) and cable 408 as maintenance apparatus 120 and support apparatus 136 travel through along a route in proximity to structure 110. For example, in some embodiments, tether body 406 includes a plurality of contact members 410 spaced around cable 408. Contact members 410 are connected to each other and may be wrapped around cable 408 in a helical shape. Contact members 410 are shaped to provide minimal contact with sidewall. For example, in some embodiments, contact members 410 are spheres. In addition, contact members 410 include a material providing less friction and less thermal conductivity than cable 408. In some embodiments, contact members 410 include a low friction and/or insulative coating. As a result, contact members 410 reduce the amount of friction between cable 408 and a surface and, therefore, the amount of force required to pull cable 408 as maintenance apparatus 120 and support apparatus 136 moves through along a surface. In addition, tether body 406 reduces heat transfer from structure 110 to cable 408.

Tether 134 includes any type of tether 134 that enables system 100 to function as described herein. In some embodiments, tether 134 may include a vacuum tube, such that maintenance apparatus 120 may perform a vacuuming operation (e.g., cleaning and/or clearing of debris). In some embodiments, tether 134 may include a supply line, such that maintenance apparatus 120 may deliver a material to target site 114. For example, the supply line may deliver a coating material to maintenance apparatus 120 and maintenance apparatus 120 may apply the coating on target site 114. In alternative embodiments, system 100 includes any tether 134 the enables system 100 to operate as described herein. For example, tether 134 may supply repair material or rolls of metal lining.

In the example embodiment, tether 134 has a tether length $L_{134}$ extending along tether body 406 from first tether end 402 to second tether end 404. In some embodiments, the tether length $L_{134}$ is in a range of 300 to 500 meters. In some embodiments, the tether length $L_{134}$ is in a range of 500 to 1000 meters. Tether length $L_{134}$ may be dependent on manufacturing limitations, transportation restrictions, and/or the type of tether 134. Length $L_{134}$ may depend on the type of tether 134 used for an operation performed by maintenance apparatus 120. For example, tether 134 that is used for a repair operation may be relatively heavy as it may be filled with repair material, may have a length of 300 to 500 meters. In another example, tether 134 may be used for an inspection operation, and is not filled with material, and has a length of 500 to 1000 meters. Accordingly, length $L_{134}$ may be longer for lighter tethers 134 and shorter for heavier tethers 134. In some embodiments, system 100 includes multiple tethers 134 operably connected. Tether 134 may be stored on spool 130 (shown in FIG. 1) for transportation and storage. Tether 134 may have any suitable length $L_{134}$ enabling the system to function as described herein.

In the illustrated embodiment, first and second tether ends 402 and 404 of tether 134 include a coupling device 414 for connecting tether 134 to maintenance apparatus 120, support apparatus 136, and/or another tether 134. For example, coupling device 414 may be used to operably connect tether 134 to maintenance apparatus 120 and/or to support apparatus 136. In addition, multiple tethers 134 may be connected together using coupling device 414. A plurality of tethers 134 may be coupled together for longer and/or more complicated routes. In some embodiments, support apparatus 136 are coupled between the plurality of tethers 134.

FIG. 5 is a block diagram of system 100 for use in maintaining structure 110 (shown in FIG. 1). System 100 includes maintenance apparatus 120, support apparatus 136, tether support device 138, controller 126, and an operator interface 502. Maintenance apparatus 120 includes a maintenance device 312, at least one first sensor 506 (e.g., maintenance sensor 318), and at least one maintenance drive system 314. Maintenance apparatus 120 also includes a transceiver 510, a processor 512, and a memory 514. Support apparatus 136 includes at least one second sensor 516 (e.g., support sensor 214) and support drive system 208. Support apparatus 136 also includes a transceiver 520, a processor 522, and a memory 524. Tether support device 138 includes a sensor 526 (e.g., device sensor 240) and a tether drive portion 528. Tether drive portion 528 includes joint actuator 226 and/or actuated mechanism 238. In alternative embodiments, system 100 includes any component that enables system 100 to operate as described herein. For example, in some embodiments, first, second, and third sensor 506, 516, and 526 are omitted. In further embodiments, operator interface 502 is omitted.

First, second, and third sensor 506, 516, and 526 may include one or more of a camera, an infrared camera, a radar sensor, an ultrasound sensor, an accelerometer, a speed sensor, an eddy current sensor, a location sensor (e.g., a global positioning sensor), and a light detecting and ranging sensor (LiDAR sensor). Third sensor 526 may include at least one of a force sensor and/or a displacement sensor. System 100 may include any type of first, second, and third sensors 506, 516, and 526 that enable system 100 to operate as described herein. In some embodiments, first and second sensors 506 and 516 may include a camera configured to provide information for driving maintenance apparatus 120 and support apparatus 136. In other embodiment, first and second sensor 506 and 516 include a camera that provides a live stream of the environment surrounding at least one of maintenance apparatus 120 and support apparatus 136. First, second, and third sensors 506, 516, and 526 may be positionable relative to maintenance apparatus 120 and/support apparatus 136. For example, sensor 506, 516, and/or 526 may include a camera mounted to maintenance apparatus 120 adjacent maintenance device 312 and configured to provide images of surface (shown in FIG. 1) for use in performing a maintenance operation.

In addition, in the example embodiment, controller 126 includes a transceiver 530, a processor 532, and a memory 534. In some embodiments, controller 126 is positioned remotely from maintenance apparatus 120 and support apparatus 136, e.g., controller 126 is located at base station 124 (shown in FIG. 1), enabling an operator, located a distance away from maintenance apparatus 120 and support apparatus 136 to interact with maintenance apparatus 120 and support apparatus 136. Transceiver 530 is communicatively coupled with transceivers 510 and 520 and is configured to send information to and receive information from transceivers 510 and 520. In some embodiments, transceiver 530 and transceivers 510 and 520 communicate wirelessly. In alternative embodiments, maintenance apparatus 120, support apparatus 136, and controller 126 communicate in any manner that enables system 100 to operate as described herein. For example, in some embodiments, controller 126 exchanges information with maintenance apparatus 120 and/or support apparatus 136 through a wired link, e.g., tether 134, extending between maintenance apparatus 120 and support apparatus 136 and controller 126.

In some embodiments, controller 126 includes a mapping interface configured to generate a map of structure 110 and/or surface 112 of structure 110 and/or an area in proximity to structure 110. For example, controller 126 may generate a map of interior cavity 119 of pipe based on information received from sensors 506, 516, and/or 526.

In addition, in the example embodiment, maintenance apparatus 120 includes a power source 536. Processor 512 is configured to execute instructions for controlling components of maintenance apparatus 120, such as maintenance device 312 and maintenance drive system 314. Maintenance drive system 314 may be powered by power source 536. Support apparatus 136 includes a second power source 538. Processor 522 is configured to execute instructions for controlling components of support apparatus 136, such as support drive system 208. Support drive system 208 may be powered by power source 538. Maintenance apparatus 120 and support apparatus 136 include any processor that enables system 100 to operate as described herein. In some embodiments, processors 512 and 522 are omitted. In some embodiments, power sources 536 and 538 may receive power from power source 122 via tether 134. In some embodiments, power sources 536 and 538 may be a separate and rechargeable battery source.

In some embodiments, maintenance device 312 includes one or more repair tools or pipe maintenance tools. For example, in the example embodiment, maintenance device 312 includes a repair tool configured to repair surface (shown in FIG. 1), and/or an inspection tool configured to inspect a portion of surface 112.

Also, in the example embodiment, operator interface 502 is configured to display information relating to the characteristics detected by sensors 506, 516, and 526 for interpretation by the operator. Operator interface 502 may be included on a remote computing device and/or may be incorporated with controller 126. Operator interface 502 may include, among other possibilities, a web browser and/or a client application. For example, in some embodiments, operator interface 502 displays images of interior surface based on received signals. In some embodiments, operator interface 502 allows an operator to input and/or view information relating to control of maintenance apparatus 120 and support apparatus 136. In the example embodiment, operator interface 502 is configured to display information relating to the state of maintenance device 312 and power sources 536, 538 for interpretation by the operator. For example, state information may include the position of support apparatus 136, position of maintenance apparatus 120, relative to positions of support apparatus 136 and maintenance apparatus 120 and/or position of support and maintenance apparatus 120 relative to structure 110 and/or target site 114 (shown in FIG. 1). State information may also include a charge status of power sources 536 and 538 and/or a current draw on the various drive and positioning motors. Processor 532 translates operator inputs into steering, tool motion, camera control, sensor control, sensor motion, and/or any other commands and sends information via transceiver 530 to maintenance apparatus 120 and support apparatus 136 via transceivers 510 and 520.

In some embodiments, operator control of maintenance apparatus 120 and support apparatus 136 is possible in real time, such as through a joystick, keyboard, touchscreen, a remote motion capture system, and/or a wearable motion capture system or other interface having similar function. In other embodiments, maintenance apparatus 120 and support apparatus 136 are controlled partially or wholly according to a pre-programmed routine. In further embodiments, maintenance apparatus 120 is at least partially automated. In some embodiments, an operator inputs information such as operation goals or conditional directions. In further embodiments, controller 126 utilizes information, such as information received by controller 126 from sensors 506, 516, and 526, to determine one or more instruction for transmitting to maintenance apparatus 120 and support apparatus 136. Additional operator inputs or state information (e.g., location, time, orientation, datalink quality, battery levels, repair material levels, failure mode indicators), may be logged into memory 534, 514, and 524.

In the example embodiment, controller 126 is positioned a distance away from structure 110 and maintenance and/or repair site 114, and communicates with maintenance apparatus 120 and support apparatus 136 positioned in proximity to structure 110 and/or surface 112 (shown in FIG. 1). For example, controller 126 is configured to send a first instruction to maintenance apparatus 120 relating to the navigation, propulsion, and/or steering of maintenance apparatus 120 while maintenance apparatus 120 is moving in proximity to structure 110, through a wireless connection and/or via tether 134. Controller 126 is configured to send a second instruction to support apparatus 136 relating to the navigation, propulsion, and/or steering of support apparatus 136 while support apparatus 136 is moving in proximity to structure 110, through a wireless connection and/or via tether 134. In some embodiments, controller 126 generates instructions for support and maintenance apparatus 120 and tether support device 138, based on information received from operator interface 502. In some embodiments, controller 126 generates instructions based on information received from sensors 506, 516, and 526.

In reference to FIGS. 1-5, during operation of system 100, controller 126 receives information, e.g., sensor data, and based on the received sensor data, controller 126 determines one or more instructions. Controller 126 transmits instructions to at least one of support drive system 208, maintenance drive system 314, actuated mechanism 238, and/or joint actuator 226. For example, controller 126 may receive sensor data from tether support device 138 indicating that the weight of tether 128 has suddenly increased. Controller 126 analyzes sensor data to determine that tether 134 may be caught on an obstacle. In response to controller 126 determining that tether 134 is caught, controller 126 determines an instruction to be transmitted to the support drive system 208 of support apparatus 136 to arrest the movement of support apparatus 136. Controller 126 may also determine an instruction which controller 126 transmits to the maintenance drive system 314 of maintenance apparatus 120 to arrest the movement of maintenance apparatus 120. In another example, controller 126 may transmit an instruction that causes support drive system 208 to reverse support apparatus 136 to reposition support apparatus 136. Additionally, and/or alternatively, controller 126 may determine an instruction to be transmitted to at least one of actuated mechanism 238 and/or joint actuator 226. For example, controller 126 may transmit an instruction causing joint actuator 226 to adjust the orientation of tether support device 138. In another example, controller 126 may transmit an instruction to actuated mechanism 238 to selectively to arrange tether support device 138 in either the translatably coupled position or the fixedly coupled position. Controller 126 may continuously and/or periodically receive sensor data and controller 126 may update and/or determine instructions that controller 126 periodically transmits to at least one of support drive system 208, maintenance drive system 314, joint actuator 226, and/or actuated mechanism 238.

In some embodiments, controller 126 may receive sensor data associated with motion of maintenance apparatus 120. For example, support sensor 214 and/or maintenance sensor 318 may be capable of detecting motion of maintenance apparatus 120. Controller 126 may receive sensor data indicating that maintenance apparatus 120 has changed speed (e.g., sped up, slowed, and/or stopped). In some embodiments, controller 126 may analyze sensor data to determine that maintenance apparatus 120 is interacting with an obstacle. Controller 126 may then determine an instruction to be transmitted to the support drive system 208 to cause the support drive system 208 to slow or stop the movement of support apparatus 136. In some embodiments, controller 126 transmits an instruction to support drive system 208 such that support drive system 208 moves support apparatus 136 to maintain a distance relative to maintenance apparatus 120. Controller 126 maintains the distance between support apparatus 136 and maintenance apparatus 120, preventing tether 134 from pulling on maintenance apparatus and/or preventing tether 134 from bunching up behind maintenance apparatus 120.

In some embodiments, tether support device 138 may perform one or more interactions with tether 134. For example, in some embodiments, support apparatus 136 includes a pump, and tether support device 138 pumps material through tether 134. In another example, tether support device 138 includes a receiver and/or a transmitter enabling tether support device 138 to relay control signals from another support apparatus 136 and/or from controller 126 to maintenance apparatus 120. In another example, tether support device 138 includes a heating unit and/or a cooling unit enabling tether support device 138 to regulate the temperature of tether 134.

FIG. 6 is a flow chart of an example method 600 of moving maintenance apparatus 120 and support apparatus 136 shown in FIGS. 1-5 along a route to a target site 114. In reference to FIGS. 1-6, method 600 includes operably coupling 602 tether 134 to maintenance apparatus 120. Tether 134 is connected to maintenance apparatus 120 to deliver at least one of power, communication, and/or materials from base station 124 to maintenance apparatus 120. Operably coupling 602 tether 134 to maintenance apparatus 120 may include arranging maintenance apparatus 120 in proximity to first tether end 402 of tether 134 and coupling first tether end 402 to maintenance apparatus 120. For example, first tether end 402 includes coupling device 414 for operably coupling 602 tether 134 to maintenance apparatus 120.

Method 600 includes positioning 604 maintenance apparatus 120 in proximity to structure 110. For example, maintenance apparatus 120 may be moved into and/or at least partially within cavity 119, towing tether 134 within the cavity 119, as support apparatus 136 travels along surface 118.

Method 600 includes coupling 606 tether 134 to tether support device 138. Tether support device 138 may be coupled to or formed integrally with support apparatus 136. In some embodiments, method 600 includes positioning tether support device 138 relative to support apparatus 136. For example, an operator may uncouple tether support device 138 from support apparatus 136 and then reposition tether support device 138 on the support apparatus 136. Coupling 606 tether 134 to tether support device 138 may include opening gate 232 and passing at least a portion of tether 134 through passageway 234 and into cavity 230. Gate 232 is then closed to capture tether 134 within cavity 230. In some embodiments, coupling 606 includes passing at least one of first tether end 402 or second tether end 404 of tether 134 through cavity 230. Coupling tether 134 may also include positioning adjustable coupling 236 to a first position or a second position to arrange tether 134 in one of translatably coupled arrangement or fixedly coupled arrangement. Additionally, in some embodiments, coupling 606 includes mounting tether support device 138 in any selected positioned between first tether end 402 and second tether end 404 of tether 134 or coupling tether support device 138 to first tether end 402 and/or second tether end 404 of one or more tethers 134. For example, an operator may selectively couple tether support device 138 such that support apparatus 136 is spaced a distance away from maintenance apparatus 120. The distance may be selected based on the type of tether 134, the length of tether 134, and/or the complexity of a route. For example, the distance between support apparatus 136 and maintenance apparatus 120 may be shortened (i.e., support apparatus 136 is closer to maintenance apparatus 120) for more complex routes. This distance may be any suitable distance which enables support apparatus 136 to support tether 134 for maintenance apparatus 120. As support apparatus 136 travels along tether 134, the distance between the support apparatus 136 and the maintenance apparatus 120 may be selectively adjusted before or during the route. In some embodiments, this distance may be adjusted while support apparatus 136 and maintenance apparatus 120 are traversing a route. For example, support apparatus 136 may increase in speed while moving relative to tether 134 positioning support apparatus 136 closer to maintenance apparatus 120. Likewise, support apparatus 136 may slow in speed and be positioned further away from maintenance apparatus 120. In addition, in embodiment including a plurality of support apparatus 136, each of the support apparatus 136 may be separated by a distance suitable to support tether 134.

In addition, method 600 includes propelling 608 maintenance apparatus 120 along a first route to target site 114 using a maintenance drive system 314. In some embodiments, method 600 includes parking maintenance apparatus 120 in proximity to target site 114. For example, in some embodiments, motors of maintenance drive system 314 rotates wheels of first and/or second maintenance drive portion 304, 308 to drive maintenance apparatus 120 along the first route. In some embodiments, rotation of wheels is stopped when maintenance apparatus 120 reaches target site 114 and maintenance apparatus 120 is parked. Method 600 may further include performing at least one of a maintenance operation, an inspection operation, and a repair operation on structure 110 using maintenance device 312. For example, maintenance apparatus 120 detects characteristics of structure 110 when maintenance apparatus 120 is parked. In some embodiments, a map is generated of surface of structure 110 in proximity of maintenance apparatus 120 when maintenance apparatus 120 is parked at target site 114. Maintenance apparatus 120 may perform a maintenance operation on a surface of structure 110 based on information from the map. Accordingly, maintenance apparatus 120 is able to operate even if sensors are unable to provide information during a maintenance operation.

Method 600 includes positioning 610 support apparatus 136 in proximity to structure 110. For example, positioning 610 includes moving support apparatus 136 near structure 110, such that the support apparatus 136 may follow maintenance apparatus 120. In some embodiments, method 600 includes positioning support apparatus near structure 110, prior to coupling 606 tether 134 to tether support device 138.

Method 600 includes moving 612 support apparatus 136 along a second route. Moving 612 support apparatus 136 includes propelling support apparatus 136 using support drive system 208 along the second route. In some embodiments, moving 612 includes towing support apparatus 136 along the second route. In some embodiments, the second route may be the same, or at least substantially the same as the first route. Alternatively, the second route may overlap at least partially with the first route and deviate from the first route at certain locations along the route. In some cases, second route is substantially different from the first route. The second route may be determined based on information associated with the path of maintenance apparatus 120. For example, controller 126 may determine the second route based on information related to speed of maintenance apparatus 120, distance between support apparatus 136 and maintenance apparatus 120, and/or tension in tether 134. In some embodiments, the second route may be determined such that tether 134 and support apparatus 136 avoid obstacles, maintain a distance between support apparatus 136 and maintenance apparatus 120, or to assist in guiding tether 134 around obstacles. Accordingly, method 600 controls the motion of support apparatus 136 and maintenance apparatus in order to prevent tether 134 from becoming kinked and/or damaged along the route.

In some embodiments, method 600 includes performing one or more tether interactions with tether 134 while maintenance apparatus 120 is propelled along the first route. Tether interactions include, but are not limited to, towing tether 134, positioning tether 134, and/or changing the direction of tether 134. In some embodiments, tether support device 138 regulates the temperature of tether 134. In some embodiments, tether support device 138 pumps material through tether 134. For longer routes, support apparatus 136 supports the weight and tows the weight of tether 134 to prevent tether 134 from restricting and/or slowing the motion of maintenance apparatus 120. For complicated routes, having one or more obstructions and obstacles, support apparatus 136 directs and orientates tether 134, preventing tether 134 from becoming caught or impinging on an obstruction. Method 600 limits wear and tear of tether 134 as support apparatus 136 reduces and/or prevents tether 134 from dragging along surfaces and becoming tangled. Further, in some embodiments, method 600 includes maintaining the temperature of tether 134, preventing overheating of tether 134. For example, in some embodiments, method 600 includes pumping a cooling fluid through a cooling line in the tether 134.

In some embodiments, method 600 includes transmitting signals between maintenance apparatus 120, support apparatus 136, and controller 126 using tether 134, located at the base station 124. In some embodiments, maintenance apparatus 120 and support apparatus 136 receive power via tether 134. Accordingly, tether 134 allows maintenance apparatus 120 and support apparatus 136 to have a compact size because components exterior of maintenance apparatus can communicate and provide signals to tether 134. Alternatively, and/or additionally, support apparatus 136 and maintenance apparatus 120 may be in wireless communication with controller 126.

FIG. 7 is a flow chart of an example method of controlling maintenance apparatus 120, support apparatus 136, and tether support device 138 in FIGS. 1-5. Method 700 includes transmitting 702 a first instruction from controller 126 to maintenance apparatus 120. For example, controller 126 transmits 702 a first instruction to the maintenance drive system 314 of maintenance apparatus 120. The first instruction includes navigational instructions for directing maintenance apparatus 120 along the first route to target site on structure 110. Method 700 includes propelling 704 maintenance apparatus 120 along the first route using maintenance drive system 314 based on the first instructions received from controller 126. Method 700 includes controller 126 determining 706 a second instruction, based at least in part on the received sensor data. For example, if the first instruction indicates that maintenance apparatus 120 traverse at a first speed, the second instruction may cause support apparatus 136 to also travel at the first speed. Moving both maintenance apparatus 120 and support apparatus 136 at the first speed maintains a distance between maintenance apparatus 120 and support apparatus 136 such that tether 134 does not pull on maintenance apparatus 120 and/or bunch up behind maintenance apparatus 120. Alternatively, and/or additionally, in some embodiments, method 700 includes controller 126 receiving at least one of a position, a speed, and/or an acceleration associated with maintenance apparatus 120. Method 700 further includes controller 126 determining the second instruction, based on, at least in part, the received at least one of a position, a speed, and/or an acceleration of maintenance apparatus 120. For example, controller 126 may receive a signal indicating that maintenance apparatus 120 has slowed down, and in response, controller 126 may update the second instruction to cause support apparatus 136 to reduce speed.

Method 700 includes transmitting 708 the second instruction to the support drive system 208 of support apparatus 136. The second instruction includes navigational instructions for directing support apparatus 136 along the second route. In some embodiments, the second route may be the same, or at least substantially the same, as the first route. Alternatively, the second route may overlap in some locations, at least partially, with the first route and deviate in some other locations along the first route. Alternatively, the second route is substantially different from the first route. The second route may deviate from the first route to enable support apparatus 136 to control the orientation of and position of tether. The second route may deviate from the first route at turn, e.g., when there is a change in direction along the route. For example, the second route may take wider turns, e.g., longer turn radius compared with the first route.

Method 700 further includes propelling 710 support apparatus 136 along the second route using the second instructions received from controller 126. Support drive system 208 interprets the second instruction to propel support apparatus 136, change speed of support apparatus 136, and/or change the direction of support apparatus 136.

FIG. 8 is a flow chart of an example method 800 of performing an interaction with tether 134 by controlling support apparatus 136, tether support device 138, and/or maintenance apparatus 120. Method 800 includes controller 126 receiving 802 sensor data from at least one maintenance sensor 318 associated with maintenance apparatus 120 and/or support sensor 214 associated with support apparatus 136 and/or device sensor 240. Method 800 includes controller 126 evaluating 804 sensor data to determine one or more parameters associated with tether 134. For example, controller 126 analyzes sensor data, and controller 126 determines the tension in tether 134 and/or the weight of tether 134. In some embodiments, controller 126 may analyze the sensor data to determine that tether 134 is caught. For example, controller 126 may continuously or periodically compare the weight of tether 134 with a weight threshold. In other examples, controller 126 may continuously or periodically monitor the weight of tether 134 to determine if there is a sudden increase or a sudden decrease in the weight of tether 134. Sensor data may include images and/or video of tether 134 and tether support device 138. Method 800 includes transmitting 806 a tether instruction to at least one of support drive system 208, maintenance drive system 314, actuated mechanism 238 and joint actuator 226. For example, controller 126 transmits 806 tether instructions to support drive system 208 to control the motion of support apparatus 136. For example, tether instruction may arrest the movement of support apparatus 136, reverse the movement of support apparatus 136, and/or speed up or slow down support apparatus 136.

In some embodiments, controller 126 transmits tether instructions to maintenance drive system 314 to control the movement of maintenance apparatus 120. Tether instructions may be transmitted to the actuated mechanism 238 in order to selectively arrange the adjustable coupling 236 in at least one of the translatably coupled configuration and/or the fixedly coupled configuration. In some other examples, controller 126 may transmit tether instructions to joint actuator 226 causing joint actuator 226 to rotate the joint 224 in order to adjust the orientation of tether 134 relative to support apparatus 136. An operator, located remotely from support apparatus 136, may observe, via operator interface 502, components of system 100 to determine if a tether interaction is necessary. For example, an operator may observe an obstruction that may interfere with tether 134. Accordingly, the operator may intervene by using controller 126 to transmit instructions to at least one of support drive system 208, maintenance drive system 314, actuated mechanism 238 and joint actuator 226.

An example technical effect of the methods, systems, and apparatus described herein includes at least one of: (a) providing a support apparatus capable of supporting and interacting with a portion of a supply tether extending between the base station and a maintenance apparatus; (b) reducing the time to inspect and/or repair a structure; (c) enabling inspection and repair of a structure at larger distances from a base station; (d) preventing the tether from restricting the motion of the maintenance apparatus; and (e) preventing the tether from becoming kinked and/or damaged along the route.

Example embodiments of systems and methods for use in maintaining structures are described above in detail. The methods and systems are not limited to the specific embodiments described herein, but rather, components of systems and/or steps of the methods may be utilized independently and separately from other components and/or steps described herein. For example, the method may also be used in combination with other components, and are not limited to practice for performing a maintenance and/or a repair operation using a maintenance apparatus. Rather, the example embodiment can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in maintaining a structure, said system comprising:
a maintenance apparatus configured to travel in proximity to the structure, wherein said maintenance apparatus comprises a maintenance drive system and a maintenance device;
a support apparatus configured to travel in proximity to the structure and to at least one of tow, support or direct a tether, said support apparatus comprising:
a body including a first end and a second end;
a tether support device coupled to said body, said tether support device comprising a housing and an actuator communicatively coupled to a controller, said controller configured to transmit an instruction to said actuator to move said actuator and arrange said tether support device in one of a plurality of different positions relative to said body; and
a support drive system coupled to said body, wherein support drive system is configured to propel said support apparatus;
said tether comprising a first tether end operatively coupled to said maintenance apparatus, a second tether end located at a base station, and a tether body extending between said first tether end and said second tether end, wherein said tether support device is coupled to said tether between said first tether end and said second tether end; and
said controller configured to send instructions to at least one of said maintenance drive system and said support drive system.

2. The system in accordance with claim 1, wherein said tether support device is translatably coupled to said tether to allow said support apparatus to translate relative to said tether.

3. The system in accordance with claim 1, wherein said tether support device is fixedly coupled to said tether.

4. The system in accordance with claim 1, wherein said housing defines a cavity, and wherein said tether extends through said cavity such that said first tether end extends past said first end of said body and said second tether end extends past said second end of said body.

5. The system in accordance with claim 1, wherein at least one of said support apparatus, said maintenance apparatus, and said tether support device comprises a sensor communicatively coupled to said controller, and wherein said controller is configured to receive sensor data collected by said sensor.

6. The system in accordance with claim 5, wherein said sensor comprises at least one of a force sensor, a camera, an infrared camera, a radar, an ultrasound sensor, a location sensor, a speed sensor, an eddy current sensor, and/or an acceleration sensor.

7. The system in accordance with claim 5, wherein said controller is configured to send said instructions to at least one of said support apparatus and said maintenance apparatus based on sensor data received from said sensor.

8. A method for maintaining a structure, said method comprising:
coupling a tether to a maintenance apparatus, the maintenance apparatus including a maintenance drive system and a maintenance device, the tether including a first tether end operatively coupled to said maintenance apparatus, a second tether end located at a base station, and a tether body extending between the first tether end and the second tether end;
positioning the maintenance apparatus in proximity to the structure;
coupling a tether support device to the tether between said first tether end and said second tether end, the tether support device coupled to a support apparatus configured to at least one of tow, support, or direct the tether;
propelling the maintenance apparatus along a first route using the maintenance drive system;
positioning the support apparatus in proximity to the structure;
propelling the support apparatus along a second route using a support drive system; and
transmitting an instruction from a controller, communicatively coupled to an actuator of the tether support device, to the actuator to move the actuator and arrange the tether support device in one of a plurality of different positions relative to the support apparatus.

9. The method in accordance with claim 8, wherein the method further comprises transmitting a first instruction to the maintenance drive system to propel the maintenance apparatus along the first route, and transmitting a second instruction to the support drive system to propel said support apparatus along the second route.

10. The method in accordance with claim 9, wherein the method further comprises determining the second instruction based on, at least in part, the first instruction.

11. The method in accordance with claim 9, wherein at least one of the support apparatus, the maintenance apparatus, and the tether support device includes a sensor, the sensor communicatively coupled to the controller, wherein the controller is configured to receive sensor data from sensor.

12. The method in accordance with claim 11, wherein the sensor comprises at least one of a force sensor, a camera, an infrared camera, a radar, an ultrasound sensor, a location sensor, a speed sensor, an eddy current sensor, and/or an acceleration sensor.

13. The method in accordance with claim 11, wherein the method further comprises determining, using said controller, the second instruction based on, at least in part, the received sensor data.

14. The method in accordance with claim 11, wherein the tether support device includes a housing defining a cavity, and wherein coupling the tether support device to the tether includes passing at least a portion of the tether through the cavity.

15. The method in accordance with claim 11, wherein the method further comprises transmitting a tether instruction to an adjustable coupling to position the tether support device in at least one of a translatably coupled arrangement and a fixedly coupled arrangement with said tether.

16. The method in accordance with claim 15, wherein the method further comprises determining the tether instruction based on, at least in part, sensor data received from the sensor, wherein the tether instruction is transmitted to the adjustable coupling.

17. A support apparatus for interacting with a tether, said support apparatus comprising:
a body comprising a housing having a first end and a second end and;
a tether support device coupled to said body, said tether comprising a first tether end operatively coupled to a maintenance apparatus, a second tether end located at a base station, and a tether body extending between said first tether end and said second tether end, said tether support device comprising a housing defining a cavity sized and shaped to receive said tether body for said support apparatus to interact with said tether, said tether support device further comprising an actuator communicatively coupled to a controller, said controller configured to transmit an instruction to said actuator to move said actuator and arrange said tether support device in one of a plurality of different positions relative to said body, said support apparatus configured to at least one of tow, support, or direct the tether; and a support drive system coupled to said body and communicatively coupled to the controller, wherein the maintenance apparatus is operably coupled to said tether, and wherein said support drive system is configured to move said body and said tether support device when said maintenance apparatus is in motion.

18. The support apparatus in accordance with claim 17, wherein said tether support device comprises an adjustable coupling which may be arranged in at least one of a first position and a second position, wherein in the first position, the tether support device is fixedly coupled to said tether, and wherein in the second position, said tether support device is translatably coupled to said tether.

19. The support apparatus in accordance with claim 17, wherein said tether support device is rotationally coupled to said body via a joint.

* * * * *